United States Patent Office 3,279,974
Patented Oct. 18, 1966

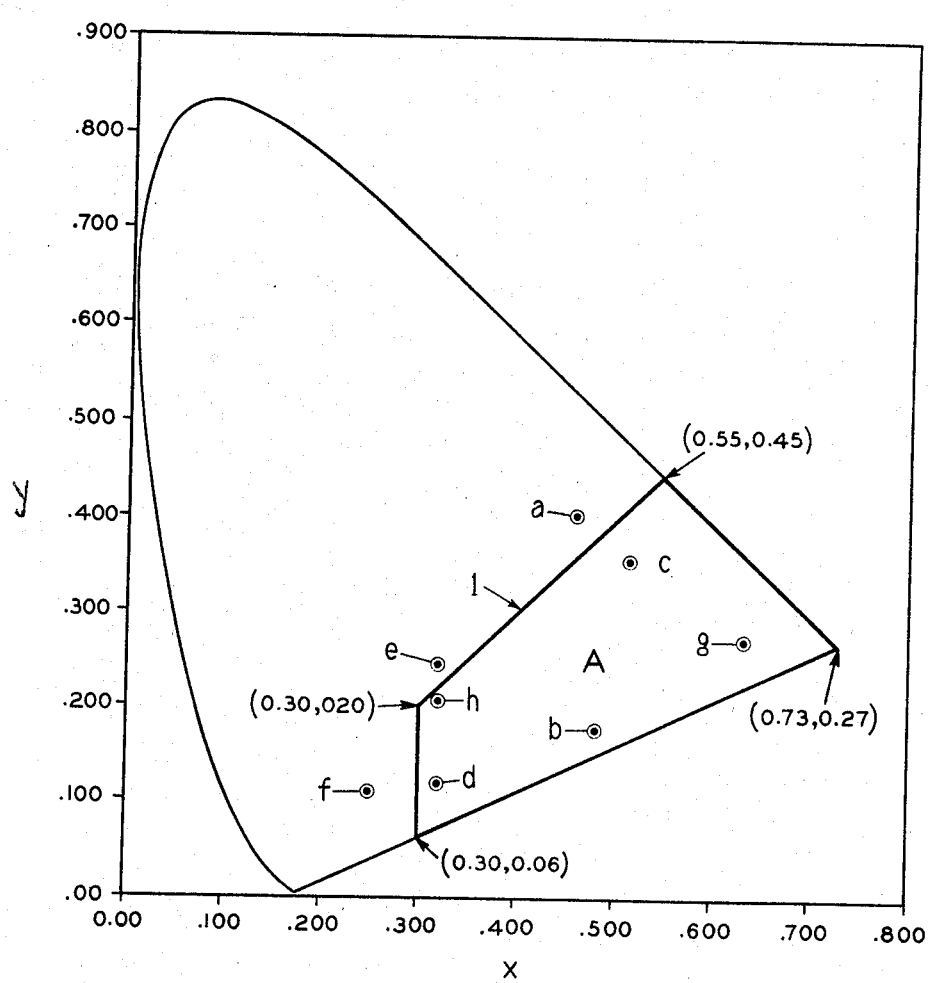
FIG.I.
ICI SYSTEM CHROMATICITY DIAGRAM

3,279,974
VISIBLY DISTINCTIVE MELT SPUN PIGMENTED YARN
Ian C. Twilley, Petersburg, Va., and Malcolm E. Matson, Mountain Lake, N.J., assignors to Allied Chemical Corporation, New York, N.Y., a corporation of New York
Filed Feb. 1, 1963, Ser. No. 271,827
2 Claims. (Cl. 161—168)

This invention relates to visibly distinctive, high strength, melt spun synthetic polymer yarns, uniform packages thereof, and methods for their production.

High strength synthetic polymer multifilament yarns such as those of polyamides and polyesters find widespread utility in many textile and industrial applications. When employed in the structural reinforcement of rubber tires, synthetic yarns and cords prepared therefrom are required to have the very highest obtainable properties of strength, uniformity, and durability. These yarns have come to be known as tire yarns, and are generally expected to have a tenacity greater than 4.0 grams per denier, initial tensile modulus greater than 24 grams per denier, good resistance to flex fatigue, and high uniformity of properties within a single yarn package or batch. Achievement of the high strength and endurance properties of tire yarn is accomplished only by careful optimization of all parameters which enter into yarn manufacture. Thus, careful control of polymer composition, spinning conditions, yarn finish agents, drawing and annealing conditions, winding and packaging conditions, and other production operations are essential to the production of acceptable quality tire yarn.

In many fiber-reinforced industrial rubber products such as automobile and aircraft tires, and power and conveyor belting, it is desirable to have within the composite reinforced structure a visible warning indicator which will indicate the occurrence of excessive abrasive wear or serious structural damage. In the recapping of fiber-reinforced rubber tires, wherein the worn tread stock surface is carefully cut from the tire carcass preparatory to replacement with fresh tread stock, it is desirable to have an effective means for visibly indicating the depth at which cutting should cease.

To an observer of normal vision, visible indicators in reinforced rubber products, to be effective under ordinary operational conditions of lighting and observation, must be distinguishable amidst conventional black rubber and the commonly employed white or yellow fibrous reinforcement. Certain critical chromatic characteristics have now been found which produce appropriate optical stimulus to provide satisfactory visible indicator properties under ordinary conditions. However, incorporation of the critical chromatic characteristics in the rubber stock, such as by use of a strata of non-black rubber as an internal visible indicator in reinforced rubber products, is found unsatisfactory in view of the difficulties of product fabrication and the poorer physical properties of rubber stocks containing no carbon black reinforcing filler. Efforts to prepare acceptable quality tire yarns having chromatic charactersistics which facilitate their use as visible indicators have generally been detrimental to the optimization of the physical properties of the tire yarns. For example, application of colorations to drawn yarns by conventional dyeing methods generally diminishes the tensile strength and initial tensile modulus of the yarn. In the package dyeing procedures generally employed for the coloration of continuous filament yarns, it is also found that non-uniformities of physical properties are created along the length of yarn on the spool package. The non-uniformities are attributable to gradients of temperature, moisture content, contractive forces, and other factors relative to internal and peripheral portions of the yarn package. Although uniformly colored yarn and packages thereof can be produced by the extrusion of suitably pigmented polymer, efforts to secure adequate chromatic characteristics without adversely affecting the extrusion or orientative drawing of yarn, or the resultant yarn properties, have hitherto been unsuccessful. Since the tire yarns are generally employed as multi-yarn cords which have been dipped with an opaque adhesive formulation to enhance bonding to rubber, visibly distinctive characteristics, to be effective, must also be internally contained so that the yarn, when severed, will be distinguishable from closely adjacent ordinary yarns similarly coated with adhesive.

It is an object of this invention to provide a novel high strength yarn which is visibly distinguishable from conventional high strength yarn in black rubber stock.

It is a further object of this invention to provide uniform packages of a novel tire yarn which is visibly distinguishable from conventional tire yarn in black rubber tires under operational conditions of tire production, wear and repair.

Other objects and advantages will become apparent in the following description and claims.

The objects of this invention are accomplished in general by providing convolutely core-wound packages of uniform melt-spun pigmented yarns having a chromaticity within area A of the I.C.I. system diagram of FIGURE 1, a luminous directional reflectance between 0.10 and 0.45, a tensile strength of at least 5.5 grams per denier, a tensile modulus of at least 27 grams per denier, and high resistance to flexural fatigue.

Suitable polymers for the production of the melt spun yarns of this invention include crystalline linear polyamides and polyesters having molecular weights above 10,000, extrudable into fibers at temperatures above the polymer melting point and at melting viscosities between 1,000 and 15,000 poises, said fibers being capable of developing axial crystalline orientation by drawing four-fold or greater, thereby developing high strength characteristics. Suitable polyamides include the condensation product of hexamethylene diamine and adipic acid (known as nylon 6, 6) having an intrinsic viscosity greater than 1.0, polymers of ε-caprolactam (known as nylon 6), polyamides of higher lactams, copolymers of lactams with diacid-diamine mixtures or other difunctional monomer species, and polymers prepared from difunctional aromatic species such as phenylene diamines and phthalic acids. Methods for the production of suitable polyamides are disclosed in U.S. Patents 2,130,948 and 2,163,636; and methods for the production of high strength yarns therefrom are described in U.S. Patents 2,859,472 and 2,289,232. Useful polyesters include condensation products of difunctional alcohols such as ethylene glycol, propylene glycol, cyclohexane diols, bisphenols, dihydroxymethyl cyclohexanes, and other analogous species, with diacids and their acid-reacting derivatives such as adipic acid, adipoyl chloride, terephthalic acid, dimethyl terephthalate, fumaric acid, and other similar analogs. Methods for the production of suitable polyesters are described in U.S. Patent 2,465,319 and British Patent 578,079; and methods for the production of high strength yarns therefrom are described in U.S. Patents 2,578,899 and 3,045,315.

FIGURE 1 depicts the I.C.I. system graph of chromaticity. Area A therein, bounded on its upper boundary by line 1, represents the range of chromaticity or combinations of hue and chroma required in the yarns of this invention to facilitate their satisfactory discernment amidst black rubber and conventional tire yarns under ordinary conditions of observation. The Area A is a quadrilateral defined by lines intersecting at points having the following $(x, y)$ coordinates: (0.30, 0.06); (0.30, 0.20); (0.55, 0.45); (0.73, 0.27). The I.C.I. system graph, its derivation and significance, are described with thoroughness in the U.S. National Bureau of Standards Circular No. 478 issued March 1, 1950; and in Ingle, G. W. "Color Measurement," Encyclopedia of Chemical Technology, 4, 1954, pp. 242–251. Briefly described, the I.C.I. system graph is based upon the theory that color vision is the ability of the human eye to respond to colors in only three ways, by responses related to blue-violet, green, and red. By the system standardized in 1931 by the International Commission for Illumination, and called the I.C.I. Trichromatic Colorimetric Coordinate System, colors are synthesized through calculation in terms of equivalent stimuli developed as additive combinations of three standard primaries. Designated as tristimulus functions, these primaries were based on reliable psychological and physiological data. Although hypothetical in that their existence is solely mathematical, they resemble the theoretical blue-violet, green, and red responses of the human observer and are considered those of the standard observer.

These functions are generally represented graphically as the amounts of each required to color-match unit energy at each of the visible wave lengths. For simplicity, the red, green, and blue-violet stimuli are designated $\bar{x}$, $\bar{y}$, and $\bar{z}$, respectively. They have been adjusted to give maximum computational convenience. In addition, the green $\bar{y}$ function is equivalent to the standard human luminosity function, which indicates relative sensitivity to visible wave length. As a result, not only does its value indicate the contribution of the green primary to the total color but also it records directly the relative luminance of the color, corresponding to one of its three dimensions, also known as lightness. The $\bar{x}$, red, and $\bar{z}$, blue-violet, functions are independent of luminance but do share with $\bar{y}$ the determination of chromaticity, a term that combines the remaining two of the three dimensions of color, generally called hue and chroma.

The combination of tristimulus values determined for a colored sample represents an equivalent stimulus only if the sample is illuminated by a standard illuminant, observed by the standard observer, and under conditions of observation like those used in establishing the I.C.I. data. Expressed mathematically by tristimulus integration, this describes the standard observer's theorized color response to a colored object "seen" under standard illumination.

Tristimulus integration proceeds in these forms for the three tristimulus values:

$$X(\text{"red"}) = \int_{380}^{780} \bar{x} I R d\lambda$$

$$Y(\text{"green"}) = \int_{380}^{780} \bar{y} I R d\lambda$$

$$Z(\text{"blue-violet"}) = \int_{380}^{780} \bar{z} I R d\lambda$$

where 380 and 780 are the accepted limiting wave lengths in millimicrons of human vision under normal conditions; $\bar{x}$, $\bar{y}$, and $\bar{z}$ are the tristimulus functions described above; I is the spectral energy distribution curve for the illuminant; and R is the spectral reflectance or transmittance factor for the colored sample under observation. If the color of the illuminant itself were being measured, R would be unity. If the spectrum of the illuminant were lined instead of continuous, these integrals would be replaced by summations at the wave lengths emitted.

Performing these triple integrations gives the tristimulus values, X, Y, and Z. These may be considered to be the amounts of each of the three primary responses which, when combined in specified amounts, produce a total color sensation, and constitute a non-subjective color specification as accurate as can be provided by scientifically objective analysis. To obtain the more readily recognizable dimensions of the color, its fractional compositions, called chromaticity coordinates, are computed from these tristimulus values:

$$x = \frac{X}{X+Y+Z}$$

$$y = \frac{Y}{X+Y+Z}$$

$$z = \frac{Z}{X+Y+Z}$$

Clearly, $x+y+z=$ unity, so that only two of these chromaticity coordinates need be specified to make all three known. If the $y$ coordinates of a representative group of colors are plotted against their $x$ coordinates, a "chromaticity" diagram is obtained in which two of the three dimensions of measured "color" are perceived in their correspondence to observed hue and chroma. Hue is the most readily evident difference in the vivid spectrum colors, such as red, yellow, and green. Chroma is the graduated difference between any one of these strong hues and achromatic white, gray, or black. If the chromaticities of these spectrum colors are plotted in this way, their loci take the shape of the circuitous path indicated by the solid line in the graph of FIGURE 1, the bottom straight line thereof representing the chromaticities of the mixtures of the two extremes of the visible spectrum. The area thus encompassed, generally referred to as the ICI system area, thus includes the locus of all physically realizable chromaticities.

The third dimension of measured color, relative luminance, is represented by distance along an axis perpendicular to the chromaticity plane of FIGURE 1. This corresponds to visually observed value or lightness which describes the gradation from white, with highest value, to black, with the least, and is that attribute of every color which determines its particular lightness or darkness. In the evaluation of opaque specimens, the specific term "luminous directional reflectance" is employed, which refers only to that flux reflected in the direction of the observer. It is more closely related to the appearance of the specimen, and is therefore more commonly used as the indication of Y. Luminous directional reflectance is the reflectance that a perfectly diffusing surface illuminated and viewed like the specimen would need to have in order to attain the same luminance as the specimen.

Thus the three dimensions, $x$, $y$, and Y are the axes of an ICI system color solid. Simple comparison to the terrestrial spheroid helps to visualize it. The black-white (achromatic) axis is the polar axis; relative luminance corresponds to latitude. The dimension of hue simulates longitude. The contours of the color solid have been calculated in terms of maximum theoretical visible chromaticities and luminances.

In the actual measurement of the color values of the yarns of this invention, a reflectance spectrum is obtained employing a Zeis model PMQ II spectrophotometer provided with standard illuminant "C" representative of average daylight such as that from a completely overcast sky and having a nearest color temperature of about 6,800° K., and provided with a white reflectance standard consisting of a surface of freshly prepared magnesium oxide prepared in accordance with National Bureau of Standards Letter Circular LC 547, March 17, 1939.

The yarn sample to be analyzed is wound onto a flat plate with sufficient winding to provide an average of at least five layers of yarn throughout the surface of the sample specimen. Three such samples for analysis are prepared from each specimen of yarn to be analyzed, and the results averaged. During measurement, the sample is accurately rotated in the viewing plane at 200 r.p.m. The light source strikes the sample at an angle of 45° C., and the sample is viewed along the perpendicular to its surface.

The values of $x$, $y$, and $Y$ are calculated from the reflectance spectrum curve for the sample by the methods described in National Bureau of Standards circular 478, March 1, 1950. The $x$, $y$ values may then be plotted on the graph of FIGURE 1. The luminous directional reflectance is determined as $Y/100,000$, wherein perfect white would have a value of 1.0, and perfect black would have a value of 0.0.

The ability of the yarns of this invention to be visibly distinguishable from ordinary tire yarn and black rubber is determined subjectively by a panel of ten observers of normal vision viewing test samples at a distance of four feet, illuminated by a standard C light source at an intensity of 20 lumens/ft.$^2$. When nine out of ten of the panel of observers agree as to the visibility of the yarn sample, it is considered satisfactory. When fewer than nine out of ten observers perceive the test yarn in the sample, the yarn is considered to be unsatisfactory. The test sample is prepared by taking a cross-section of a black rubber stock having imbedded therein three layers of fabric prepared from 840 denier, two ply cord having been treated with a resorcinol formaldehyde-latex adhesive dip by the general method described in U.S. Patent 2,846,752, and a top fabric similarly prepared from the yarn to be tested, the cross-section being made so that about 25 cord ends per inch of all fabric layers are exposed to the observer. When tested in this fashion it is found that yarns having a luminous directional reflectance below the lower limit of this invention become visibly indistinguishable from black rubber, and yarns having a luminous reflectance above the upper limit of this invention become indistinguishable from conventional white or yellow tire yarns. When the chromaticity values of the yarn $(x, y)$ are outside area A of FIGURE 1, the yarns become indistinguishable from either the black rubber or the other tire yarn present.

The yarns of this invention are prepared by the melt extrusion of a suitably pigmented polymer. Since the polymers of established value for the preparation of tire yarns, for example polyamides and polyesters, are melt spun at temperatures above 260° C., it is necessary that any pigments employed possess an exceptionally high degree of thermal stability. It has been found that less than .5% of pigment based upon the weight of polymer must be employed in securing the yarns of this invention, and the average discrete pigment particle size must be below .5 micron. Greater pigment amounts and larger pigment sizes prevent the satisfactory extrusion and orientative drawing of fibers. The pigments must also be uniformly dispersable throughout the molten polymer with sufficient dispersion stability to minimize the formation of large agglomerates. Certain organic pigments have generally been found preferable to inorganic pigments in the practice of this invention in view of their high tinctorial strength and dispersion stability in the organic polymer medium. Specific pigments useful singly or in combination with other colorants in the practice of this invention include phthalocyanine blue, cadmium sulfide, cadmium sulfo selenide (i.e. cadmium selenium lithopone), cadmium mercury lithopone, molybdate orange, carbon black, titanium dioxide and especially 2,9-dimethyl-quinacridone, described for pigmenting polyamides in copending U.S. application Serial No. 156,146 of Gerson et al., filed November 30, 1961. The 2,9-dimethyl-quinacridone imparts color characteristics in the desired area at concentrations between about 0.05% and about 0.5% by weight of the yarn.

In the pigmentation process, excellent results are readily obtained with polycaproamide, we have found, using pigment dispersions prepared by forming a mixture of the pigment with ε-caprolactam, suitably aqueous caprolactam, and 1%–50% (based on the weight of the pigment) of a non-ionic dispersing agent which is thermally stable; and submitting the mixture to the action of a viscous plastic mixer; a sand grinder; a colloid mill, a homogenizer; or a roller mill or the like dispersion apparatus at viscosity adjusted by temperature and water content to insure complete wetting and breaking of the pigment agglomerates. The proportions of pigment, caprolactam, and water are adjusted to give suitable viscosity for handling in the particular dispersion apparatus chosen, at the operating temperature of the apparatus. To allow ready dispersibility of the resulting product in additional lactam, the lactam:pigment proportion in the product should be at least about 1:5 by weight; and can be much higher, e.g. up to 20:1 by weight and higher; but larger quantities than say 10:1 tend to become uneconomic in requiring the handling of large volumes of material in the dispersion apparatus. The proportion of water:pigment can be about 5:1 by weight and lower. Our dispersions resist agglomeration by heat, and dilution with additional lactam preparatory to and during polymerization; and thus afford an unexpected advantage over prior art pigmentation methods which usually require the presence of viscous, polymerized lactam to prevent at least some measure of pigment agglomeration during polymerization operations. The polymer obtained by mixing our dispersions to afford pigment concentration of 0.05%–0.5% by weight throughout a large amount of ε-caprolactam, containing water (say 0.5%–10% by weight of water), and heating in absence of oxygen, e.g. under pressure, with eventual removal of water can be spun to continuous multifilament yarn and hot drawn to draw ratios of at least 4:1.

Preferred classes of thermally stable dispersing agents for use in our invention are ethylene oxide adducts of lipophilic organic compounds particularly of alcohols, amines and acids; and polyvinyl pyrrolidone. The amounts of these agents employed, namely about 1 part–50 parts per 100 parts by weight of pigment in the dispersion, are chosen to promote dispersion without foaming. We have found that the above named preferred agents are thermally stable under polymerizing conditions as required for our invention, and are effective to prevent flocculation under these conditions, by contrast to the ionic agents ordinarily used in aqueous systems in which pigments are to be dispersed.

The preferred pigmentation process of this invention is also useful for the incorporation of other finely divided organic particles in polycaproamide.

The tensile modulus as employed herein may be defined as the initial modulus or the ratio of change in stress to strain in the first reasonably linear portion of a stress-strain curve. The ratios calculated from the stress, expressed either in force per unit linear density or force per unit area of the original specimen, and the strain expressed either as a fraction of the original length or as percent elongation. When strain is expressed in terms of elongation, the modulus equals 100 times the quotient (stress/strain). Tensile modulus is also equivalent to 100 times the force in grams per denier required to stretch the specimen the first 1%. In this procedure, the modulus is determined at 10% elongation based on the slope of the curve at 1%; the modulus at 1% as calculated from this value. In either method, the factor 100 is a constant used to convert the modulus in grams per denier to a whole number. In the present work, the modulus is obtained from yarn stress-strain curves measured by the Instron Tensile Tester (model TTB, supplied by Instron Engineering Corp., Quincy, Mass.), which stretches the yarn at a constant rate of elongation. From the stress-strain curve, the slope of the initial straight line portion is determined graphically, and the modulus is calculated as 100 times the slope, divided by the denier of the sample. All yarn is conditioned for 7 days at 75° F., 72% relative humidity prior to testing.

The flexural fatigue characteristics of yarns are generally measured on two-ply cords imbedded in rubber. Specific suitable test methods include those described in ASTM-*d*-885, Mallory U.S. Patent 2,412,524, and elsewhere. In the Mallory method the cords are imbedded longitudinally and cured into a transversely reinforced section of rubber tubing. The section of tubing is bent at an angle of 90° and kept inflated while it is rotated about its own axis. The test cords are thus subjected alternately to extension and compression. "Fatigue life" is the number of revolutions (in kilocycles) required to cause the tube to fail. The minimum fatigue life, as measured by this method, which has been found to be acceptable for tire construction is generally considered to be about 400 kilocycles, or about 43 hours when measured by the ASTM-Goodyear tube test. During the standard cord-forming and adhesive dipping operations preparatory to formation of reinforced rubber test specimens and commercial articles in general, it is important that conditions be maintained so as not to adversely affect the cord strength or uniformity.

Satisfactory packages of the visibly distinctive yarn of this invention may be formed by convolutely winding the novel yarn onto rotating circular core structures such as tubes, cones, cops, pirns, spools, or beams of various materials of construction. The windings on spools and beams having flanges may consist of numerous separate yarns each confined to distinct parallel zones, whereas other package types generally consist of a single yarn end wound with sufficient traverse to form a self-supporting package requiring no flanges. The packaging operation may be carried out in situations where the yarn is wound up into a package at the take-up end of a continuous yarn spinning operation, or rewound from one type of package to another type of package used or desirable in separate drawing, twisting or other operations in the production of tire yarn of this invention. Unlike packages of yarn prepared for package dyeing on perforated cores and having windings which provide a high air space content, the yarn packages of this invention are compact, dense, and hard, containing less than 50% void space. The packages are very stable, and eminently suited for shipping purposes, affording a high degree of protection to the yarn material. The control of tension during the package winding operation is critical, since fluctuation of winding tensions can cause non-uniformities in the physical properties of the packaged yarn. Suitable tension controlling means for use on twisted or untwisted yarns on traversing or non-traversing packages are well known; suitable tensions are about 0.1 gram per denier.

The invention is further illustrated by means of the following examples which, however, are not intended to limit its scope. All parts and percentages are by weight unless otherwise indicated.

*Example 1*

A dispersion of the pigment 2,9-dimethyl-quinacridone (known as "Quindo Magenta," supplied by Allied Chemical Corporation, New York, N.Y.) was prepared by mixing the following ingredients: 57 parts water, made alkaline (pH 8–9) with aqueous 50% sodium hydroxide; 25 parts of $\epsilon$-caprolactam; 3 parts of a non-ionic surface active agent consisting of polyoxyethylene glycol adduct of tallow wax, sold under the trademark Alkanol HC; and 15 parts of 2,9-dimethyl-quinacridone pigment. The mixture was agitated until it formed a smooth paste which was then passed through a continuous sand grinder of the type described in U.S. Patent 2,581,414, employing a residence time of 50 minutes to insure complete wetting and breakdown of agglomerates. The dispersion so produced was very stable and contained pigment having an average particle size below 500 millimicrons.

Some 14.4 pounds of the dispersion thus prepared were diluted with the same amount of distilled water and the diluted dispersion was added with agitation to 375 lbs. of $\epsilon$-caprolactam at 90° C. contained in a melt polymerization kettle. This mixture was heated over a period of ¾ hour from 90° C. to 135° C. Over a period of ¼ hour the temperature of the mixture was elevated from 135° C. to 150° C. and a steam pressure of 40 p.s.i.g. was allowed to build up in the kettle headspace above the molten mixture. The pressure was held constant at 40 p.s.i.g. by venting as the melt temperature increased from 150° C. to 255° C.

At 255° C. the steam pressure was released over a one hour period. After the steam pressure was released and the polymer melt became viscous enough to float polymer chips, 25 lbs. were charged of master batch of unwashed polymer containing 10% of the aromatic amine antioxidant sold under the trademark Flexamine, which is predominantly the high temperature-high pressure reaction product of acetone and diphenylamine after-reacted with formaldehyde per U.S. Patent 1,906,935 of May 2, 1933 to Horst as in Example A and Example 1 thereof. The charging of master batch was through an air-tight addition pot over a period of 30 minutes. The surface of the polymer melt at 255° C. was swept with dry inert gas until the desired melt viscosity was obtained.

The resulting polymer was extruded, pelletized, washed and dried. The resulting dry polymer contained 0.3% Quindo Magenta pigment, and had a formic acid relative viscosity of 36, as determined by ASTM procedure D–789–53T.

The polymer thus prepared was spun at 260° C. from a 3½ inch Davies-Standard screw extruder at 25.8 lbs. per hour into a 136 filament yarn bundle. The yarn was drawn over the sharp corner of a plate heated at 185° C., using a draw ratio of 4.5, thereby producing an 845 denier yarn bundle.

The yarn was subsequently wound onto a flanged beam at constant tension. The void content of the beamed yarn was 8.32%, as determined from the gross geometry of the winding, its total weight, and the known specific gravity of the yarn.

The yarn thus prepared had the following properties:

Ultimate tensile strength _____grams per denier__ 8.6
Ultimate elongation _____percent__ 18
Tensile modulus _____grams per denier__ 29
Shrinkage in boiling water _____percent__ 12
Chromaticity:
   $x$ _____ 345
   $y$ _____ 155
Luminous directional reflectance _____ .16
Fatigue resistance:
   Goodyear tube test (hours life) _____ 48.8
   Firestone flex fatigue (percent strength
     retained—20 hrs.) _____ 73.0
   Goodyear disc fatigue (percent strength
     retained—48 hrs.) _____ 82.7

Adhesion of 2-ply dipped cord in tire stock by the "static strip test" at room temperature measured 30.0, a satisfactory value for tire cord.

When successive samples are selected for analysis from various portions throughout the yarn package, the maximum variation for any measured property is found to be below 20%. The yarn, when employed in reinforced black rubber samples for determination of visual distinctiveness in conjunction with an ordinary tire yarn prepared in accordance with this example but omitting the pigment, is found satisfactorily distinguishable by all ten of a panel of observes of normal color vision and 20/20 eyesight.

*Example 2*

Employing the general method of Example 1, a series of yarns of various chromaticity and luminous directional reflectance are prepared by using various types and mixtures of suitable pigments. The samples prepared and test results obtained thereon are indicated in Table I. The indicator qaulity of the yarn is designated as satisfactory (S) when at least nine of the ten panel observers perceive the yarn under proper test conditions, and is designated unsatisfactory (U) when fewer than nine of the panel observers perceive the yarn. The chromaticity coordinates of the samples are plotted as labeled points in FIGURE 1. As the data of Table I indicate, yarns having chromaticities or luminous directional reflectances outside the prescribed range of this invention are not satisfactory as visibly distinctive yarns. It is also indicated (sample g) that excessive amounts of inorganic pigment, although providing satisfactory visible characteristics, adversely affect the strength characteristics of the yarn. Samples b, c, d, and h, within the scope of this invention, are found to have fatigue resistance values not more than 10% below the control sample a.

products which unexpectedly differ in effect from closely analogous products of neighboring yet different chromatic characteristics. The general phenomena of invoking differences in kind or effect by means of distinctive chromatic characteristics is generally known. For example, red automobile warning lights are visible in conditions of fog where blue lights, due to the scattering effect of the fog particles, would be invisible. In provoking responses in certain animal species, it is found that certain chromatic characteristics are effective and others ineffective.

The yarns of this invention are also useful in other applications where high strength, visibly distinctive yarns may be desirable for other purposes, for example, parachutes, ropes, netting, safety seat belts, selvage indicators for in-rubber industrial fabrics, and other applications.

TABLE I

| Sample | Pigmentation | Chromaticity | | Luminous Directional Reflectance | Indicator Quality | Tensile* Strength | Tensile* Modulus | Fatigue Resistance (Goodyear-hours) |
|---|---|---|---|---|---|---|---|---|
| | | x | y | | | | | |
| a | None—control | .460 | .405 | .643 | | 8.5 | 35 | 44.6 |
| b | Quindo Magenta plus Cadmium Sulfoselenide. | .480 | .180 | .220 | S | 5.7 | 34 | 47.2 |
| c | Quindo Magenta plus Cadmium Sulfide. | .515 | .360 | .350 | S | 6.4 | 35 | 42.6 |
| d | Quindo Magenta (0.5%) | .320 | .120 | .105 | S | 8.5 | 32 | 43.5 |
| e | Quindo Magenta (0.05%) plus Carbon Black. | .320 | .245 | .285 | U | 8.4 | 36 | 48.4 |
| f | Quindo Magenta plus Phthalocyanine Blue. | .260 | .110 | .085 | U | 7.3 | 33 | 45.4 |
| g | Cadmium Sulfoselenide (1.4%) | .635 | .275 | .140 | S | 3.8 | 19 | 37.5 |
| h | Quindo Magenta (0.07%) | .325 | .205 | .425 | S | 8.5 | 36 | 48.8 |

*Grams per denier.

Example 3

An 840 denier continuous multifilament tire yarn of polyethylene terephthalate is prepared having a tensile strength of 5.8 grams per denier and a tensile modulus of 85 grams per denier. The yarn is packaged on a perforated core and is wound with a 45% void volume in the package. The package of yarn is then submitted to a recirculating package-dyeing process employing a 212° F. aqueous solution containing 2% Polyester Red B, a product of Eastman Kodak Co., a benzoic acid carrying agent, and 1% of non-ionic surfactant, and maintaining a contact period of one hour. The yarn thus dyed is visibly distinctive, having a chromaticity within area A of FIGURE 1, and an acceptable luminous directional reflectance. However, its tensile strength after dyeing is only 3.8 grams per denier, and its tensile modulus only 23 grams per denier with a variability of 28% throughout the package, thus making the yarn unacceptable for tire reinforcement use. By way of contrast, the same yarn, when prepared from polymer in which 0.3% Quindo Magenta has been incorporated by conventional melt blending technique at average particle size below 0.5 micron, retains the original high strength characteristics, and in addition, possesses satisfactory chromactic characteristics.

The luminous directional reflectance is generally dependent upon factors such as the pigment type, concentration and particle size, the presence of whitening or fluorescing agents, filament surface area and configuration, and the presence of other tire yarn polymer additives such as heat and moisture stabilizers. Comparative studies of the luminous directional reflectance of various yarn samples should thus be run on analogous products whenever it is desired to systematically isolate and study each of the various contributing factors involved.

The range of satisfactory values of luminous directional reflectance encompassed by the present invention is roughly comparable to the range of Munsell values between 3.7 and 7.2, as defined in A. H. Munsell, "A Color Notation," Munsell Color Company, Baltimore, 1947.

The visibly distinctive tire yarns of this invention are

The yarns are useful in various deniers, and the individual filaments may have various cross-sectional configurations such as circular, angular, multilobal, heart-shaped, and others, depending upon the specific application.

This application is a continuation-in-part of our U.S. application Serial No. 249,149, filed January 3, 1963.

We claim:
1. A continuous multifilament yarn from synthetic fiber-forming polymer of the group consisting of polyamides and polyesters, having chromaticity within area A of the I.C.I. system diagram of FIGURE 1 herein and luminous directional reflectance between 0.10 and 0.45, said characteristics being imparted thereto by 2,9-dimethyl-quinacridone incorporated in amounts between about 0.05% and about 0.5% by weight of the yarn uniformly throughout said yarn at average particle diameter not above about 0.5 micron; which yarn is further characterized by its high tensile strength of at least 5.5 grams per denier, tensile modulus of at least 27 grams per denier, high flexural fatigue life of at least 43 hours measured by the ASTM-Goodyear tube test, and uniformity of these physical properties within ±20% throughout the yarn length.

2. Reinforced rubber comprising black rubber stock, having imbedded therein continuous multifilament yarn which yarn is characterized by having chromaticity within area A of the I.C.I. system diagram of FIGURE 1, a luminous directional reflectance between 0.10 and 0.45, said yarn being composed of at least one synthetic fiber-forming polymer of the group consisting of polyamides and polyesters, said polymer having uniformly incorporated throughout in amount between about 0.05% and about 0.5% by weight, 2,9-dimethylquinacridone with average particle diameter not above 0.5 micron, said yarn being further characterized by its high tensile strength of at least 5.5 grams per denier, tensile modulus of at least 27 grams per denier, high flexural fatigue life of at least 43 hours measured by the ASTM-Goodyear tube test, and uniformity of these physical properties within ±20% throughout the yarn length.

(References on following page)

References Cited by the Examiner

UNITED STATES PATENTS

| | | | |
|---|---|---|---|
| 2,205,722 | 6/1940 | Graves | 260—37 |
| 2,571,319 | 10/1951 | Waters et al. | |
| 2,861,865 | 11/1958 | Siggel | 18—54 |
| 2,868,757 | 1/1959 | Symons | 260—37 |
| 2,966,390 | 12/1960 | Hoelkeskamp et al. | 18—54 |
| 3,009,310 | 11/1961 | Marchie et al. | 57—140 |
| 3,012,994 | 12/1961 | Bell et al. | |
| 3,020,279 | 2/1962 | Woodlock et al. | 106—288 X |
| 3,058,290 | 10/1962 | Gibbins et al. | 57—140 |
| 3,066,034 | 11/1962 | Temin | 260—37 X |
| 3,074,950 | 1/1963 | Deuschel et al. | 106—288 X |

FOREIGN PATENTS

| | | |
|---|---|---|
| 743,064 | 1/1956 | Great Britain. |
| 910,642 | 11/1962 | Great Britain. |

MERVIN STEIN, *Primary Examiner.*

DONALD W. PARKER, *Examiner.*

A. J. SMEDEROVAC, *Assistant Examiner.*